US006947657B1

(12) United States Patent
Chen et al.

(10) Patent No.: US 6,947,657 B1
(45) Date of Patent: Sep. 20, 2005

(54) VARIABLE OPTICAL ATTENUATOR

(75) Inventors: Chihchung Chen, Taipei (TW); Chengkuo Lee, Taipei (TW)

(73) Assignee: Asian Pacific Microsystems, Inc., Hsinchu (TW)

(*) Notice: Subject to any disclaimer, the term of this patent is extended or adjusted under 35 U.S.C. 154(b) by 0 days.

(21) Appl. No.: 10/855,702

(22) Filed: May 28, 2004

(51) Int. Cl.$^7$ .......................... G02B 6/00; G02B 6/26; G02B 6/35; H02N 2/04
(52) U.S. Cl. ....................... 385/140; 385/18; 385/31; 359/291
(58) Field of Search ............................. 359/198, 200, 359/223, 224, 290, 291; 385/31, 39, 140, 385/147; 310/152, 324

(56) References Cited

U.S. PATENT DOCUMENTS

| | | | |
|---|---|---|---|
| 5,668,655 A | * 9/1997 | Schweizer et al. | .......... 359/198 |
| 6,137,941 A | 10/2000 | Robinson | |
| 6,333,584 B1 | 12/2001 | Jerman | |
| 6,459,845 B1 | 10/2002 | Lee | |
| 6,469,415 B2 | 10/2002 | Jerman | |
| 6,501,600 B1 | 12/2002 | Godil | |
| 6,538,816 B2 | 3/2003 | Fuchs | |
| 6,628,856 B1 | 9/2003 | Costello | |
| 6,628,882 B2 | 9/2003 | Vaganov | |
| 2003/0026582 A1 | * 2/2003 | Hout et al. | .................. 385/140 |
| 2004/0037493 A1 | * 2/2004 | Lee et al. | ...................... 385/18 |
| 2004/0061417 A1 | * 4/2004 | Hwang | ........................ 310/324 |

OTHER PUBLICATIONS

Kim et al, "MEMS Reflective Type Variable Optical Attenuator Using Off-Axis Misalignment" School of Electrical Engineering and Computer Science, Seoul National University, pp. 55-56.

Yeh et al, "Full-Range Linearization of Rotary Combdrive-Actuated Micro-Mirrors for Optical Telecommunication" Dep't of Power Mechanical Engineering, National Tsing-Hua University, Hsinchu, Taiwan, pp. 93-94.

Grade et al, "MEMS Electrostatic Actuators for Optical Switching Applications".

Toshiyoshi et al, "A 5-Volt Operated MEMS Variable Optical Attenuator" 2003 IEEE pp. 1768-1771.

Chen et al, "Development and Application of Lateral Comb-Drive Actuator" 2003 The Japan Society of Applied Physics, Jpn. J. Appl. Phys. vol. 42 2003, pp. 4059-4062.

(Continued)

*Primary Examiner*—Akm Enayet Ullah
(74) *Attorney, Agent, or Firm*—Dennison, Schultz, Dougherty & MacDonald

(57) ABSTRACT

A variable optical attenuator for providing a new light attenuation mechanism based on using at least one of tilted mirrors to change and control the beam direction of reflected light beam toward output optical port in a two dimensional light path configuration is demonstrated to achieve the light attenuation in terms of changing and controlling the coupling loss among input optical port, reflective tilted mirrors, and output optical port. The tilted mirror is supported and connected by a suspended flexure spring at one side. This suspended spring is connected with tilted mirror at one side and is anchored on a substrate at the other side via a post (or a pivot). When the tilted mirror is driven by an actuator to generate movement including rotational mirror deflection and parallel mirror shifted displacement, the reflected light beam path is changed according to the particular mirror positions. The attenuation value is modified and controlled by the coupled light of reflected light beam to output port. The structure and materials of variable optical attenuator is designed and chose to be robust to environment mechanical and thermal noise.

16 Claims, 14 Drawing Sheets

OTHER PUBLICATIONS

Chen et al, "Novel VOA Using In-Plane Reflective Micromirror and Off-Axis Light Attenuation" IEEE Optical Communications 2003, pp. 516-520.

Bashir et al, "A MEMS-Based VOA With Very Low PDL" IEEE Photonics Technology Letters, vol. 16, No. 4, 2004, pp. 1047-1049.

Barber et al, "A Fiber Connectorized MEMS Variable Optical Attenuator" IEEE Photonics Technology Letters, vol. 10, No. 9 1998, pp. 1262-1264.

Marxer et al, "A Variable Optical Attenuator Based on Silicon Micromechanics" IEEE Photonics Technology Letters, vol. 11, No. 2, 1999, pp. 233-235.

Andersen et al, "MEMS Variable Optical Attenuator for DWDM Optical Amplifiers" Lucent Technologies, Optoelectronics Center, Breinigsville, PA, pp. 260-262.

Lee, "Challenges in Optical MEMS commercialization and MEMS Foundry" Asia Pacific Microsystems, Inc., 2002.

* cited by examiner

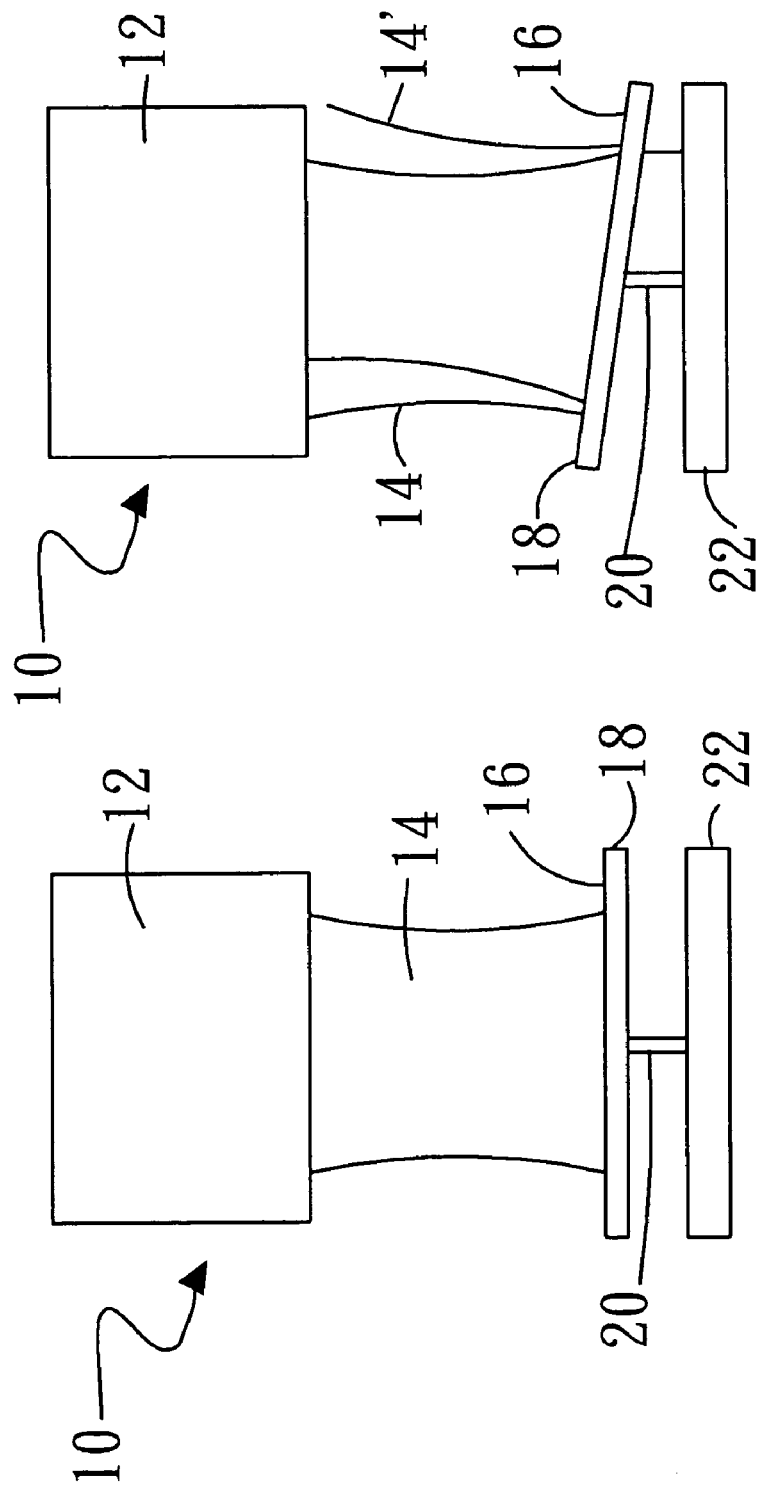

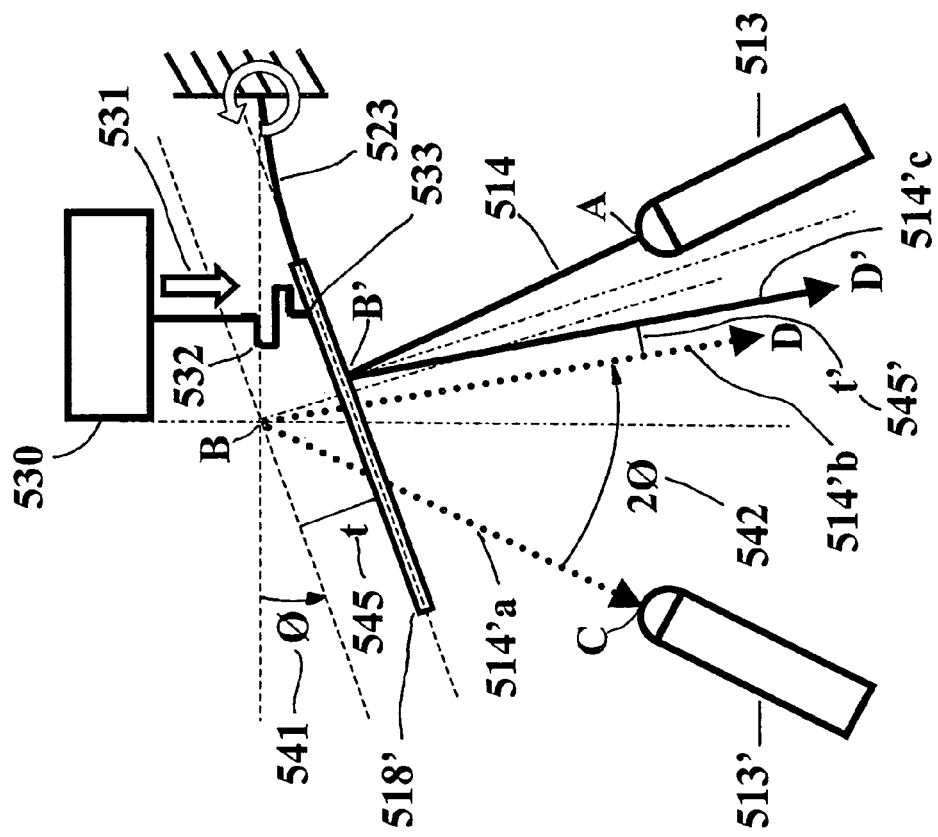
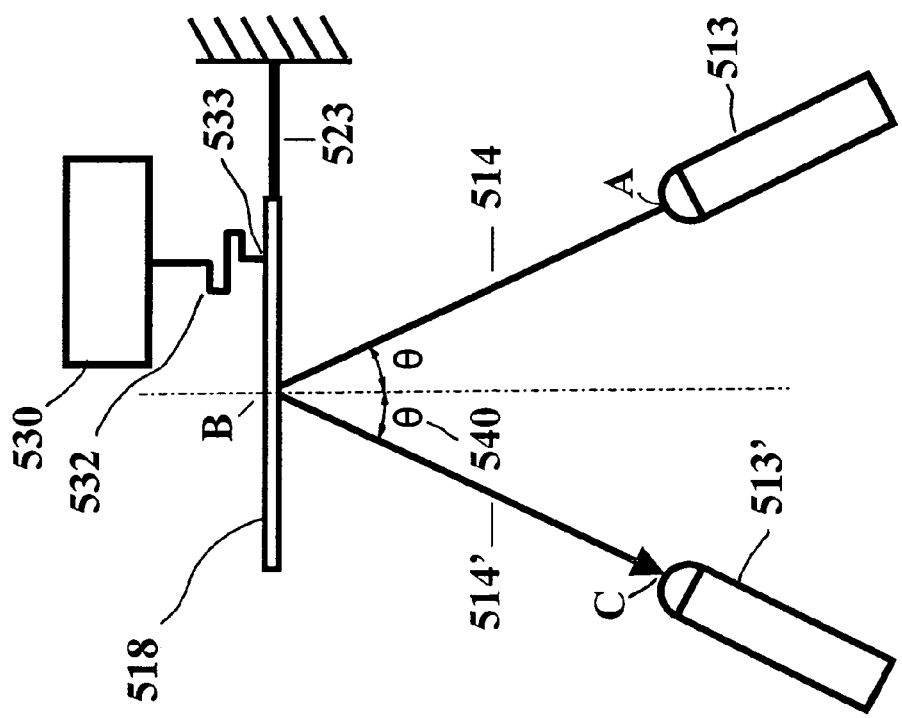
Fig. 5D
Fig. 5C

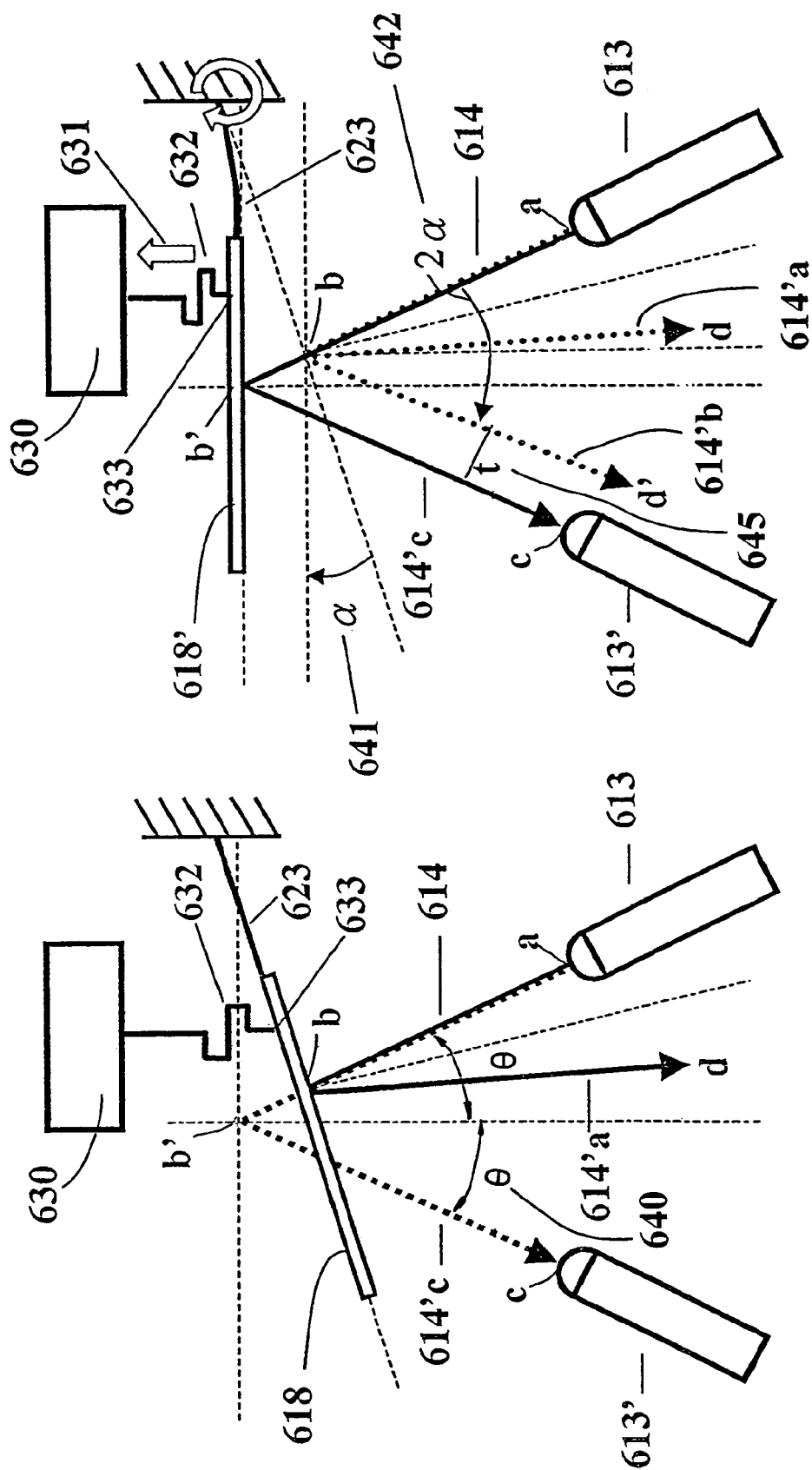

VARIABLE OPTICAL ATTENUATOR

BACKGROUND OF THE INVENTION

1. Field of the Invention

The present invention relates to the fiber optical components used in telecommunications. More particularity, the present invention discloses a variable optical attenuator (VOA) which is able to control the amount of light power propagating in optical networks.

2. Description of the Prior Art

The industry of fiber optical communications has already proven to be indispensable for the achievement of low noise, long distance telecommunication with a heretofore-unrealizable high bandwidth. Within an optical communication network a Variable Optical Attenuator (VOA) is an important basic component with the function of controlling the propagated level of light power, such as a single-channel VOA or a VOA array.

Currently, there are four kinds of commercially available VOA devices in the market, they are opto-mechanical VOA devices using stepping motor or magneto-optical crystal, and VOA devices based on waveguide technology, using liquid crystal (LC) technology, and using Micro-Electro-Mechanical Systems (MEMS) technology. The opto-mechanical VOAs are capable of providing consistent and stable attenuation by using stepping motor or magneto-optic crystal to drive a shutter or light blocker into a light beam to obstruct part or all of the light power. However, they can not be minimized to meet the needs of high channel-count integration due to the bulky size of the stepping motor or the electromagnetic coil. Essentially, the major drawbacks are their bulky size, long response time, difficulty of system integration and high cost. The waveguide and LC VOAs, while being suitable for high channel-count integration, are lack of consistent and stable attenuation expressed in the form of high insertion loss (IL), high Polarization Dependent Loss (PDL), high Polarization Mode Dispersion (PMD) and sensitivity to ambient temperature. The temperature sensitivity is caused by a differential coefficient of temperature change of the refractive index between the waveguide and/or LC material and connected glass fiber cores. The forth approach is the MEMS based VOA. It is known as a promising alternative to realize free space light attenuation with excellent device performances at the aspects such as, short response time, wavelength independence, protocol and bit rate independence, etc. Because the size and weight of MEMS elements are relatively small, therefore the energy required to drive the MEMS actuator, mirror, and structure is lower than the other approaches, in the other words; the power consumption of MEMS VOA is lower than the other alternatives. The package size of MEMS VOA device is comparatively smaller than the other alternatives, as well.

However, the associated IL and back-reflection loss (BR loss) of MEMS VOAs can not be easily perfected due to the existing interfaces among different optical elements according to its nature of free space optical operation scheme. In order to reduce IL and BR loss, it is necessary to have good optical alignment with respect to all optical elements in micrometer scale. The requirement of precise and dedicate assembly works among MEMS elements, optics, and fibers leads to higher manufacturing cost. The traditional MEMS VOA device adopted four sorts of device configurations. The first reported MEMS VOA devices leave a narrow air gap between two fiber ends to allow the insertion of a MEMS shutter into the axial light path, i.e., so-called in-line type VOA. In this approach the MEMS shutter and fibers are assembled on top of silicon substrate. The light attenuation range for VOA application is determined in terms of the relative position of MEMS shutter, where this in-plane position is controlled via force balance between spring force and force generated by micro-actuators. Thereby it can control relative amount of attenuation by blocking part of light beams. B. Barber, et al., "A fiber connectorized MEMS variable optical attenuator," IEEE Photon. Technol. Lett., Vol. 10, No. 9, pp. 1262–1264, September 1998, and C. Marxer, et al., "A variable optical attenuator based on silicon micromechanics," IEEE Photon. Technol. Lett., Vol. 11, No. 2, pp. 233–235, February 1999, describe MEMS VOA devices based on this in-line type device configuration.

The second sort of device configuration is using the micromachined reflective grating modular to be operated as a voltage controllable variable optical attenuator, disclosed by A. A. Godil et al, "Polarization independent grating modular," U.S. Pat. No. 6,501,600, Dec. 31, 2002. Besides, combining optics and a tilted mirror (or rotational mirror) to be assembled in three-dimensional configuration is proposed to be an approach of making MEMS VOA devices by several groups, the attenuated light is controlled by changing the tilted angle of said mirror. These published literatures regarding to the tilted mirror based approach include B. M. Andersen, et al., "MEMS variable optical attenuator for DWDM optical amplifiers," in proceedings of Optical fiber communication conference (OFC 2000), Vol. 2, p. 260–262, Mar. 7–10, 2000; K. C. Robinson, "Variable optical attenuator," U.S. Pat. No. 6,137,941, Oct. 24, 2000; H. Toshiyoshi, et al, "A 5-volt operated MEMS variable optical attenuator," in proceedings of TRANSDUCERS, 12th International Conference on Solid-State Sensors, Actuators and Microsystems, Vol. 2, pp. 1768–1771, Jun. 8–12, 2003; R. Wayne Fuchs, et al., "Micro-electro mechanical based optical attenuator," U.S. Pat. No. 6,538,816, Mar. 25, 2003; B. J. Costello, et al., "Optical switch," U.S. Pat. No. 6,628,856, Sep. 30, 2003; V. I. Vaganov, "VOA device and attenuation method with improved linearity," U.S. Pat. No. 6,628,882, Sep. 30, 2003. But both of grating and tilted mirror types of MEMS VOA devices require dedicate three-dimensional (3D) assembly works and precisely alignment works among the MEMS elements, optics, and housing.

Again, the BR loss and PDL of the in-line type VOA device is normally higher than the values derived from the grating and tilted mirror based VOA devices. It is because that the scattering light is so easy to be coupled into the input fiber port due to the characteristics of in-line light path design. The forth type of so-called off-axis reflection type MEMS VOA device comprises off-axis aligned input and output fiber ports, and is using a reflective mirror, in which is capable of moving along with one in-plane axis, to change the reflected light beam path according to different mirror position, thereby the light attenuation value is determined in terms of the coupled reflected light intensity regarding to parallel shift of reflected light path, i.e., the attenuation value is controlled via the mirror position. This off-axis in-plane light path design can naturally reduce the back-reflection loss what we normally saw in the in-line type VOA devices. Moreover, in this off-axis in-plane reflection type MEMS VOA case, the optical fibers and optics can be aligned and assembled on the top of silicon substrate of MEMS chip in a two-dimensional (2D) arranged manner (planar type) with the aids of micromachined trenches and alignment marks, etc. The tedious and labor intensive works regarding to 3D assembly and alignment works can be got rid of. The relative technology has been reported and disclosed by several groups, including C. Lee, "Challenges in optical MEMS commercialization and MEMS foundry", Oral presentation materials in IEEE/LEOS International Conf. on Optical MEMS 2002, Lugano, Switzerland, Aug. 20-23, 2002; C.-H. Kim, et al., "MEMS reflective type variable optical attenuator using off-axis misalignment" in proceeding of IEEE/LEOS International Conf. on Optical MEMS 2002, Lugano, Switzerland, Aug. 20–23, 2002; J. H. Lee, et al., "Variable optical attenuator," U.S. Pat. No. 6,459,845, Oct. 1, 2002; C. Chen, et al., "Development and application of lateral comb drive actuator," Jpn. J. Appl. Phys., vol. 42, Part 1, No. 6B, p. 4067–4073, June 2003; C. Chen, et al., "Novel VOA using in-plane reflective micromirror and off-axis light attenuation", IEEE Communications Mag., Vol. 41, No. 8, pp. S16–S20, August 2003; A. Bashir, et al., "A MEMS-based VOA with very low PDL," IEEE Photonics Technology Letters, Vol. 16, No. 4, p. 1047–1049, 2004.

It is also important for VOA devices to have low IL, low PDL, and low BR loss for practical applications. Combining the MEMS elements with micro-optics provides VOA devices a free-space light path design approach. This is a key way to make the light beam coming from input fiber become collimated beam shape thereby to gain in better optical performances. The larger collimated beam size, from several tens to hundreds of micrometers, will make better optical performance, and make the acceptable alignment tolerance higher. However, it will also lead to a requirement that the corresponding MEMS actuator has to be able to provide enough static displacement to let micromirror fully block the incoming light beam in the case of in-line type, or reflect the incoming light beam perfectly in the case of off-axis in-plane reflection type. Controversially the tilted mirror based MEMS VOA can more efficiently modify the coupled light intensity by changing the reflected light angle. Thus the corresponding actuation displacement, or actuator driving voltage, or actuator power consumption of the tilted mirror based MEMS VOA is less than the required values for VOA devices based on other approaches, although tilted mirror based MEMS VOA devices suffered with the difficulty of 3D assembly and alignment.

According to aforementioned functional requirements for VOA application, the desirable design of a VOA should be based on free space light attenuation, an efficient approach to achieve light attenuation regarding to actuator design and attenuation mechanism, and planar (2D in-plane) assembly and alignment works. Therefore, the present invention provides a new VOA device especially with emphasizing in fulfilling such design requirements.

SUMMARY OF THE INVENTION

Accordingly, the present invention has been proposed to solve the foregoing problems of the prior art and it is an object of the invention to provide a variable optical attenuator which is able to electrically control the attenuation value in terms of adjusting the coupling loss, when light is reflected and transmitted toward the output port. The variable optical attenuator of present invention comprises at least one reflective tilted mirror that is connected with a flexure spring supported by a post anchored onto a substrate; and said reflective tilted mirror that is driven by an actuator to move from an initial rest position to an actuated position, wherein this mirror movement including rotational mirror deflection and parallel mirror shifted displacement. The present invention also discloses that the optics and fibers of input and output ports are aligned, arranged, and assembled with said tilted mirror onto a carrier substrate in a two-dimensional (planar) optical light path arrangement. The attenuation mechanism is conducted by changing the reflected light beam direction regarding to particular mirror positions, thus the attenuation value is controlled in terms of adjusting the overall coupling loss in one or plural reflections.

In accordance with one aspect of the present invention, the flexure spring holds said tilted mirror at one side and is connected with a pivot at the other side, and it can be deformed to let said tilted mirror to exhibit movement including rotational mirror deflection and parallel mirror shifted displacement. Therefore this new tilted mirror configuration is more efficient for changing the reflected light beam path than prior arts of central pivoted tilted mirror.

In accordance with one aspect of the present invention, a spring is located between said tilted mirror and said actuator to transfer force or displacement generated from said actuator to said tilted mirror, and this spring includes a portion of flexure part that is capable of absorbing the environment shock or vibration without disturbing the transferring of actuation.

In accordance with one aspect of the present invention, the flexure spring holding said tilted mirror at one side, and the spring located between said tilted mirror and said actuator can be made of versatile materials, including silicon, ceramics, glass, metals, polymers, elastic materials, etc. Thereby the anti-mechanical-shock capability can be promoted.

In accordance with one aspect of the present invention, there is at least one flexure spring mechanically connected and contacted with said tilted mirror to enhance the device capability of anti-mechanical-shock.

In accordance with one aspect of the present invention, there are plural tilted mirrors individually driven by relative actuators to perform the multiple reflections in a VOA device where the mirrors are arranged and assembled with optics and fibers of input and output ports to form a planar light path configuration.

In accordance with one aspect of the present invention, the initial state of said VOA device can be no coupling loss, i.e., fully transmitted light path configuration after one or more than one reflections, or so-called normally bright type operation. The light is attenuated when the VOA device is under operation, where this operation is conducted in terms of controlling the overall coupling loss after one or more than one reflections via adjusting the relative positions of mirrors.

In accordance with one aspect of the present invention, the initial state of said VOA device can be fully attenuated, i.e., no transmitted light after one or more than one reflections, or so-called normally dark type operation. A portion of incident light is started to be transmitted when the VOA device is under operation, where this operation is conducted in terms of controlling the overall coupling loss after one or more than one reflections via adjusting the relative positions of mirrors.

BRIEF DESCRIPTION OF THE DRAWINGS

Exemplary embodiments of the invention will now be described in conjunction with the drawing, in which:

FIG. 1B is the side view graph of a device shown in FIG. 1A in a full optical coupling state.

FIG. 1C is the side view graph of a device shown in FIG. 1A in an optical attenuation state.

FIG. 5C illustrates the initial state of bright type operation of the present invention shown in FIG. 5A.

FIG. 5D illustrates the attenuation state of bright type operation of the present invention shown in FIG. 5A.

FIG. 6A illustrates the initial state of dark type operation of the present invention shown in FIG. 5A.

FIG. 6B illustrates the actuated optimal state, i.e., no attenuation state, of dark type operation of the present invention shown in FIG. 5A.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art. Matched with corresponding drawings, the preferable embodiments of the invention are presented as following and hope they will benefit your esteemed reviewing committee members in reviewing this patent application favorably.

Figure 1A:
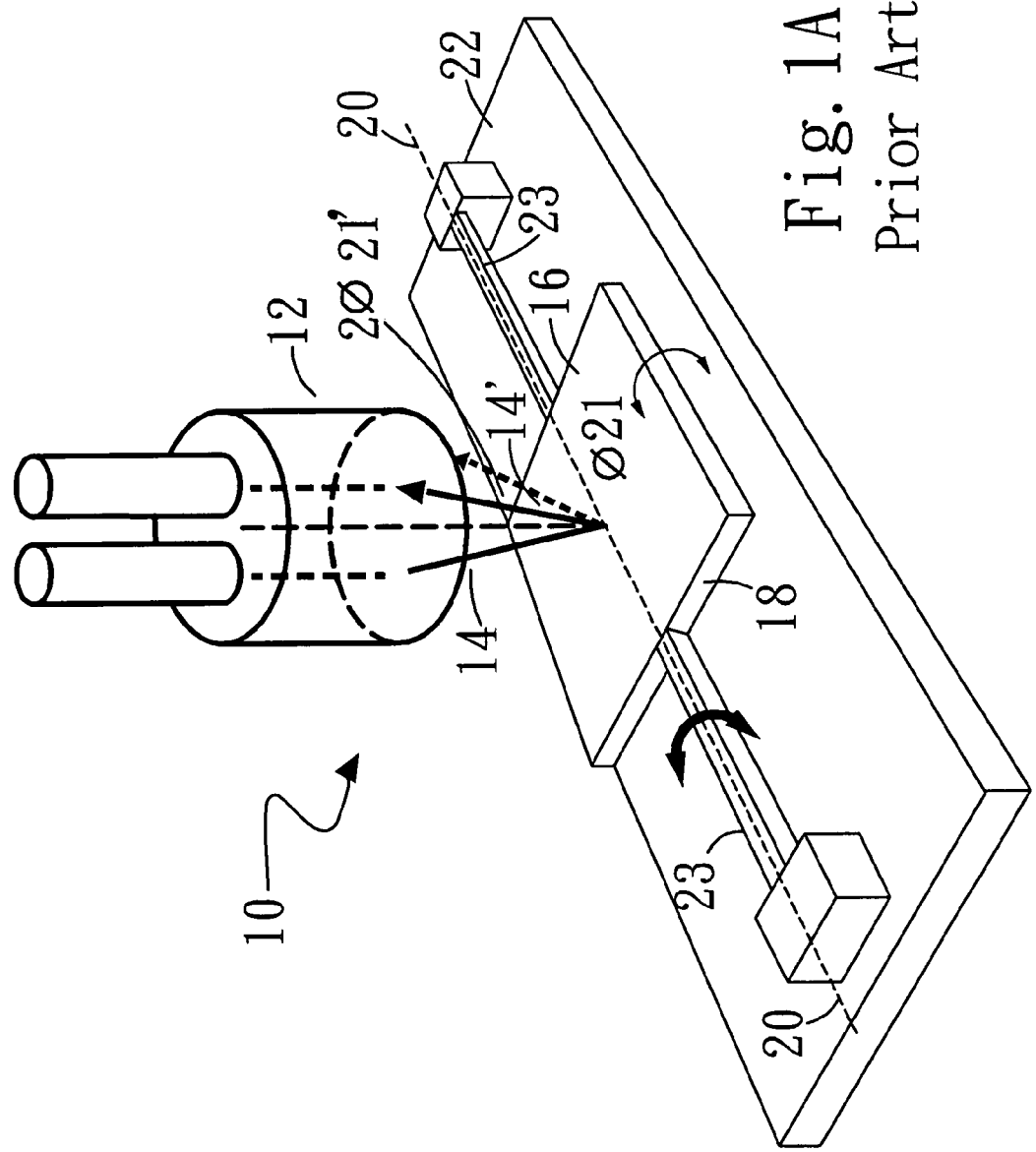
FIG. 1A is a schematic illustration of the prior art of MEMS variable optical attenuator comprising a tilted mirror based on three-dimensional light path arrangement.
Figure 2A:
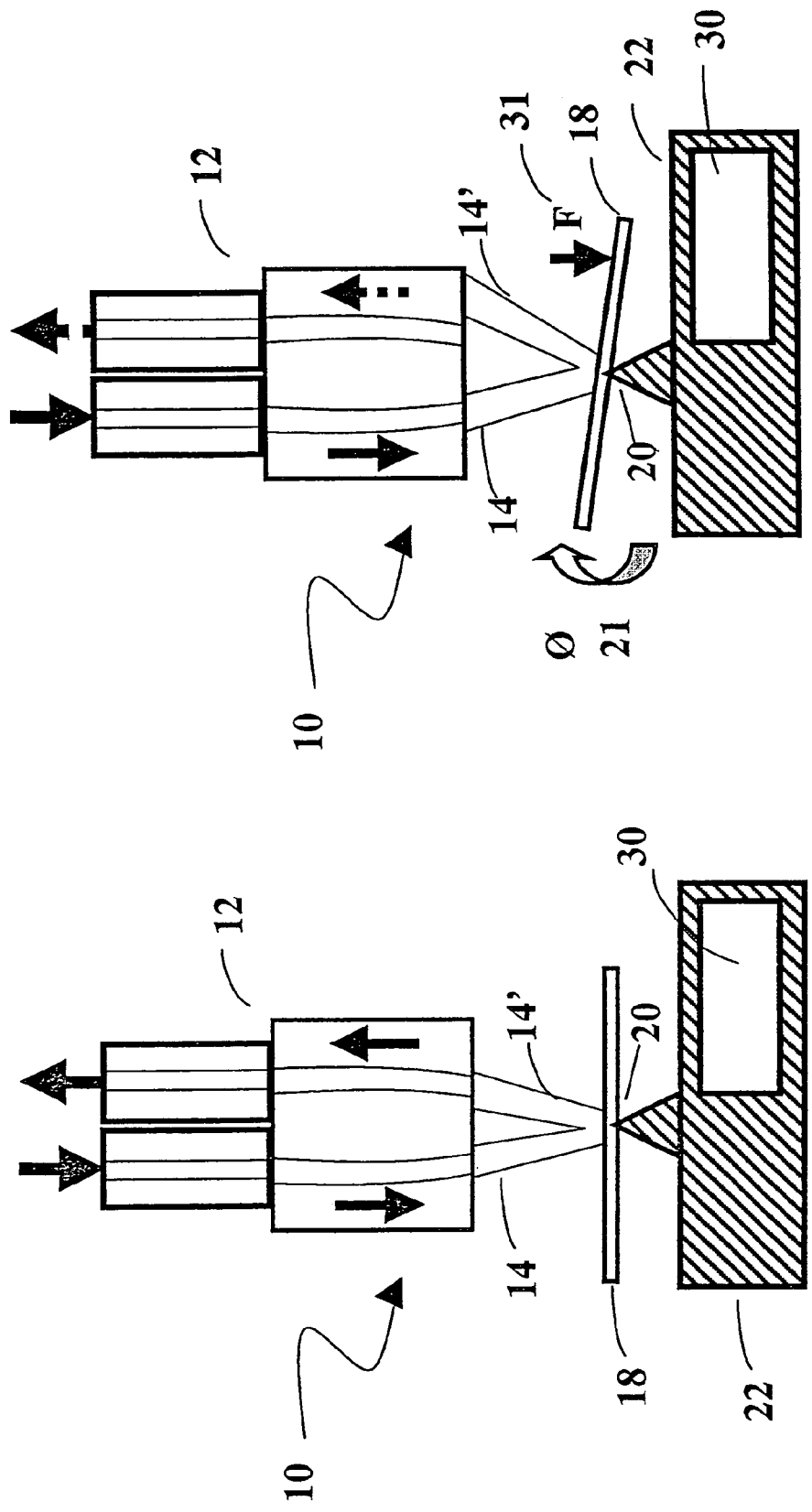
FIG. 2A is the schematic diagram of bright type VOA operation of a device shown in FIG. 1A.

Referring now to FIGS. 1A, 1B and 1C, a typical prior art of MEMS variable optical attenuator (VOA) based on tilted mirror arrangement 10 is shown schematically. An optical system 12 is shown generally, it includes optical input port and optical output port, and a system of optical coupling elements and lens for directing a beam of incoming light 14 from input port to the reflective surface 16 of the free-standing mirror 18. The mirror 18 is supported by a fulcrum hinge (or a torsional hinge) 23 above a substrate 22 to permit mirror angular deflection or mirror rotation. When the mirror 18 is under actuation, the mirror 18 undergoes rotational movement along with the central axis 20. With respect to different deflection angles, Ø 21, of mirror 18, a beam of reflected light 14' is directing to corresponding spatial direction, where the shifted angle, 2Ø 21', between two states of reflected light 14' is twice of said deflection angles, Ø 21. FIGS. 1B and 1C show the cross-section view of VOA device 10 in FIG. 1A. FIG. 1B exhibits the initial state of VOA device 10 in a low loss state, the mirror 18 is positioned to reflect the beam of light 14 along a reflection path substantially identical to the path of reflected light 14' was launched on from the optical system 12. Thus the reflected light beam 14' is returned to the optical system 12 at an angle for optimum coupling regarding to output port, i.e., no attenuation or minimum insertion loss. When a force, F 31, from MEMS actuator is applied between the mirror 18 and the substrate 22 regarding to an external electrical load, the mirror 18 is deflected to lead the reflected light beam 14' is returned to the optical system 12 at an angle which does not enable optimum coupling, and attenuation occurs, as shown in FIG. 1C and FIG. 2A. The MEMS actuator will further deflect the mirror as a response to increasing value of said external electrical load until the maximum deflection, or highest attenuation is reached. This case of operation mechanism of VOA is called as the normally open type operation. Since almost no incoming light is attenuated at the initial state, this kind of VOA is also called as bright type VOA, as shown in FIG. 2A.

Figure 2B:
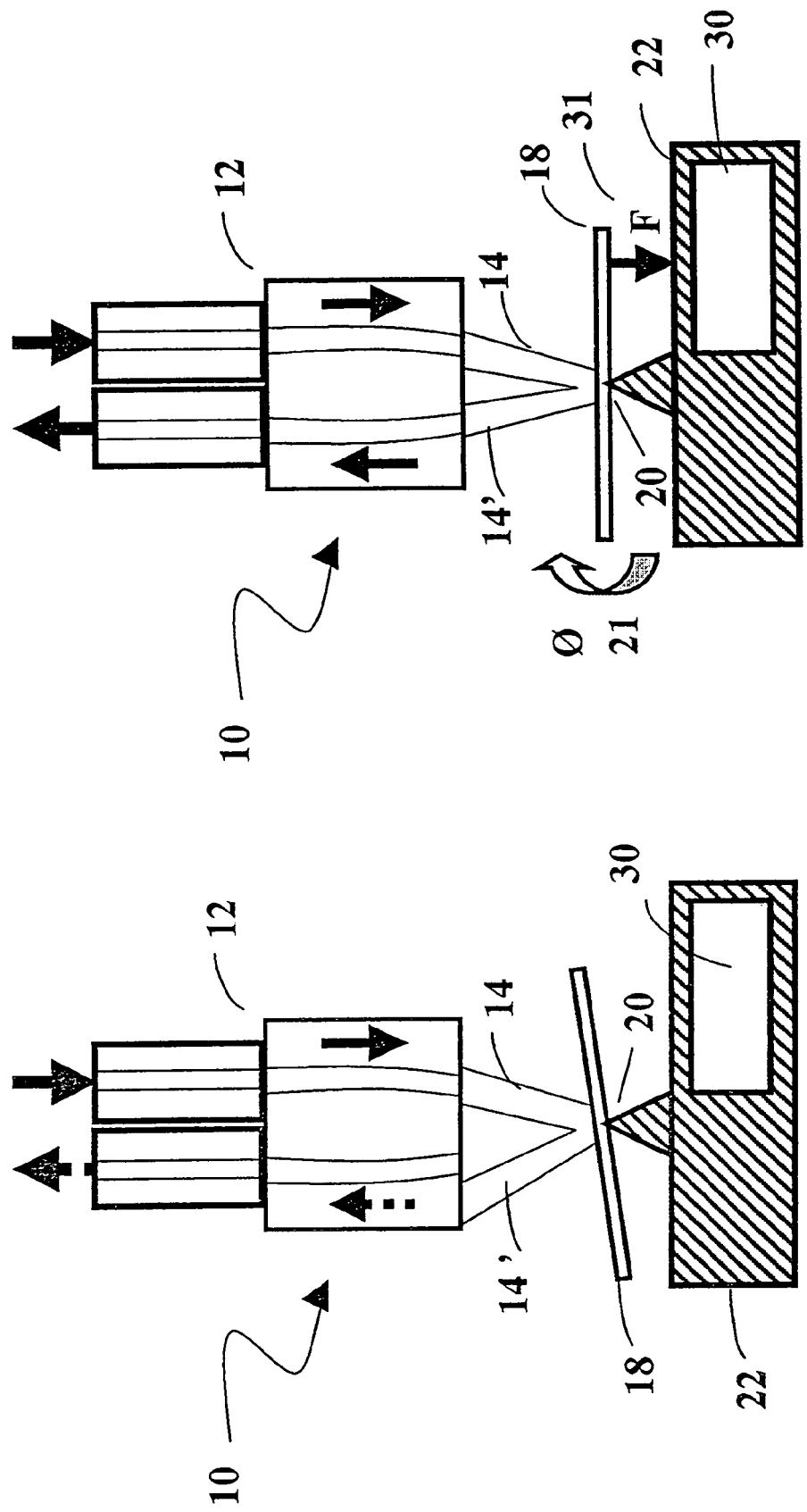
FIG. 2B is the schematic diagram of dark type VOA operation of a device shown in FIG. 1A.

To further explain the counter part of bright type VOA, i.e., the dark type VOA, the dark type VOA device is schematically depicted in FIG. 2B. The VOA device 10 is in its fully attenuation state in FIG. 2B. The mirror 18 is positioned to reflect the beam of light 14 along a reflection path of reflected light 14' returned to the optical system 12 at an angle for fully attenuation or maximum insertion loss regarding to output port. When a force, F 31, from MEMS actuator is applied between the mirror 18 and the substrate 22 regarding to an external electrical load, the mirror 18 is deflected to lead the reflected light beam 14' is returned to the optical system 12 at an angle which achieves better coupling, i.e., less attenuation or less insertion loss. The MEMS actuator will further deflect the mirror as a response to increasing value of said external electrical load until the maximum deflection, or minimum attenuation is reached. This case of operation mechanism of VOA is called as the normally close type operation. Since almost all incoming light is attenuated at the initial state, this kind of VOA is also called as dark type VOA.

Figure 3A:
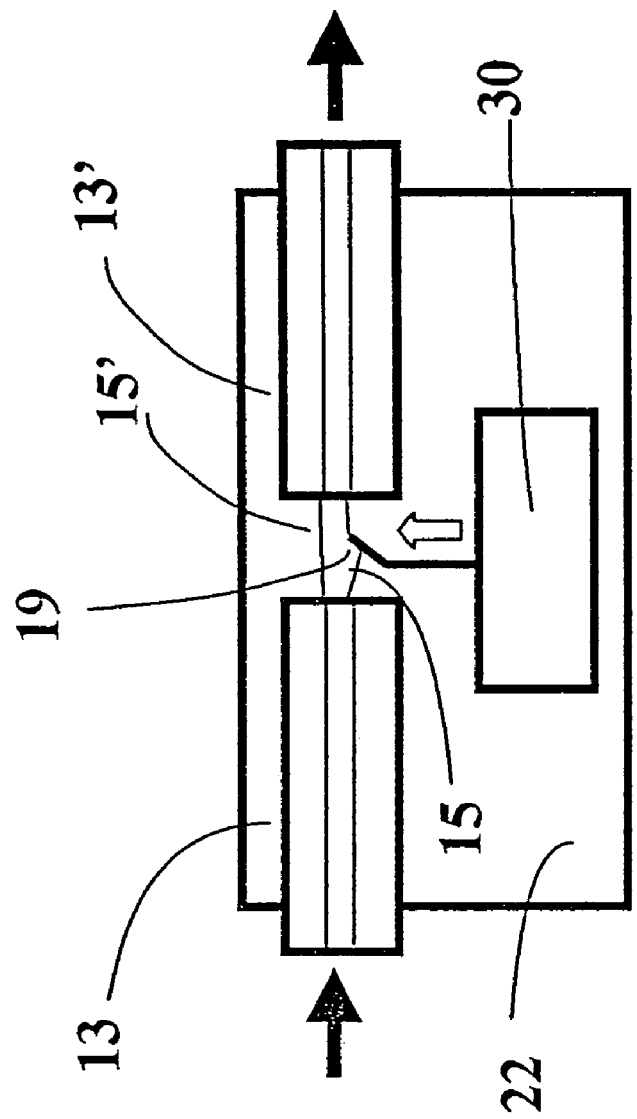
FIG. 3A is a schematic illustration of an in-line type MEMS VOA in two-dimensional light path arrangement of prior art.
Figure 3B:
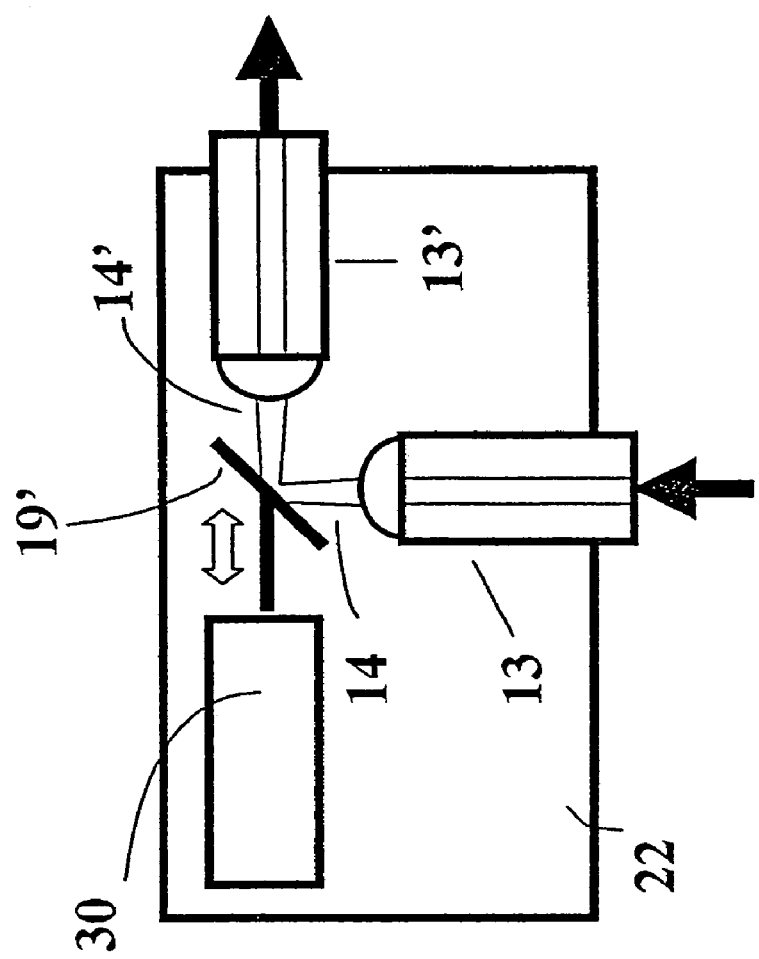
FIG. 3B is a schematic illustration of an off-axis reflection type MEMS VOA in two-dimensional light path arrangement of prior art.

FIGS. 3A and 3B depict the device configurations of in-line type and off-axis reflection type MEMS VOAs, respectively. In the case of in-line type VOA device, the actuator 30 drives the micro-shutter 19 to block part of incoming light 15 from the input port 13, the rest part of incoming light beam 15' has been coupled into output port 13'. The attenuation value is determined by the relative position of the micro-shutter 19. For the off-axis reflection type VOA device, the light path of the reflected light beam 14' is changed by moving the reflective mirror 19'. The actuator 30 drives the reflective mirror 19' according to different applied voltages. With respect to different light paths of 14', the attenuation value is determined by the relative coupled light of reflected light beam 14' to output port 13'. Besides, all the relative elements including actuator 30, and input and output optics or fibers 13, 13' can be integrated on a silicon substrate 22 by using planar assembly techniques and MEMS technology. This way can drastically reduce the assembly and alignment works in terms of using 2D (planar) manner.

Figure 4A:
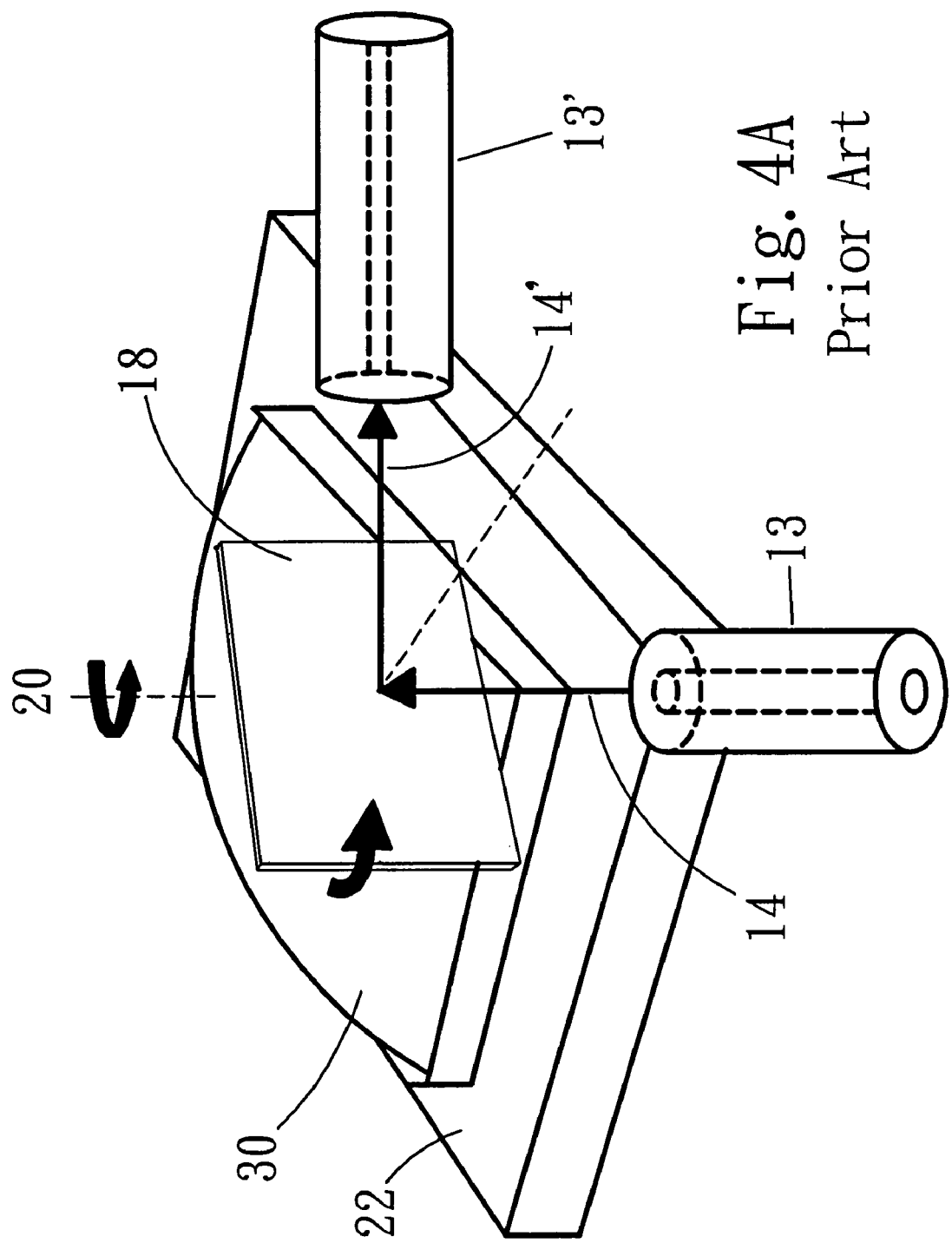
FIG. 4A is a schematic illustration of a prior art of VOA device using a pop-up rotational mirror driven by an in-plane movable rotary comb actuator.
Figure 4B:
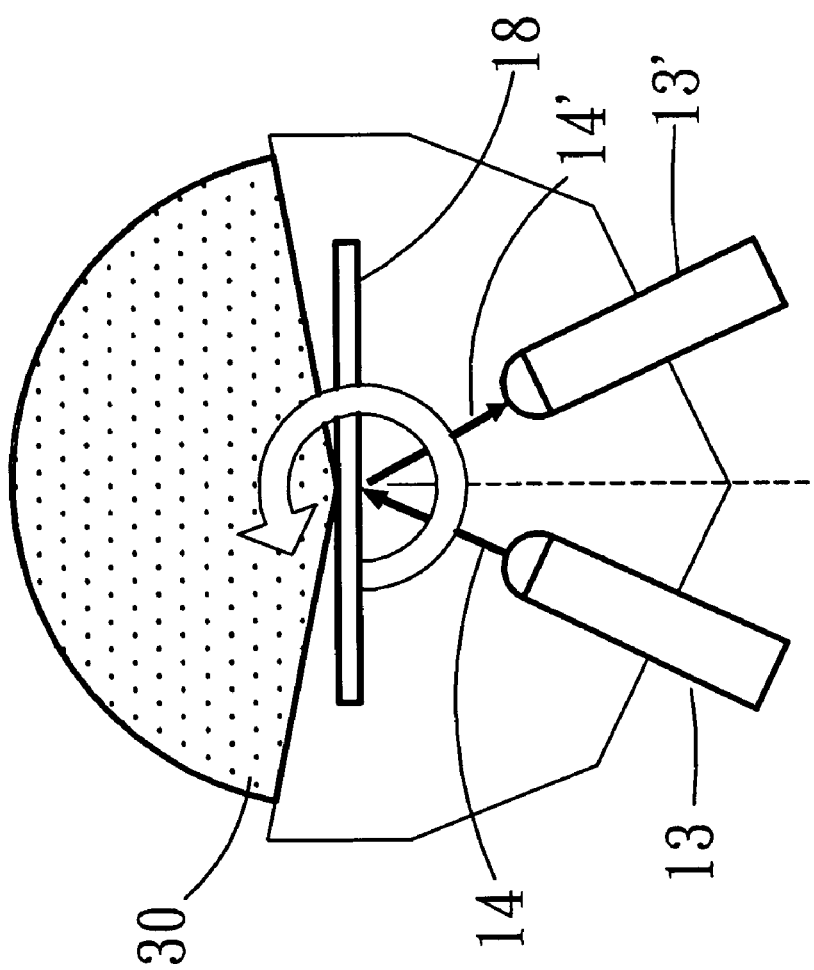
FIG. 4B is a top view of the prior art VOA device of FIG. 4A.
Figure 5A:
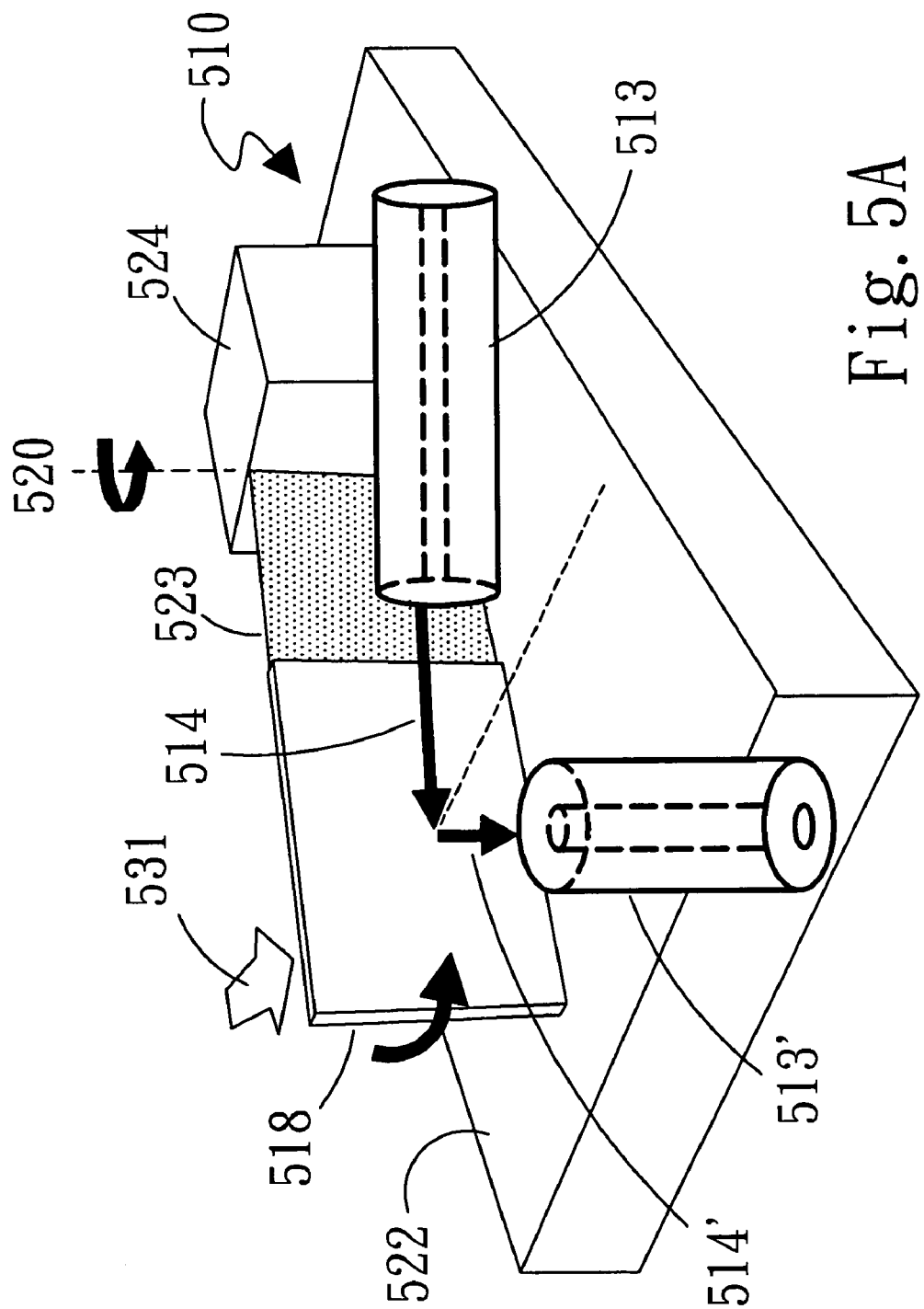
FIG. 5A is a schematic illustration of the present VOA, which comprises an in-plane tilted mirror and a pair of input port and output port of optics and fibers.
Figure 5B:
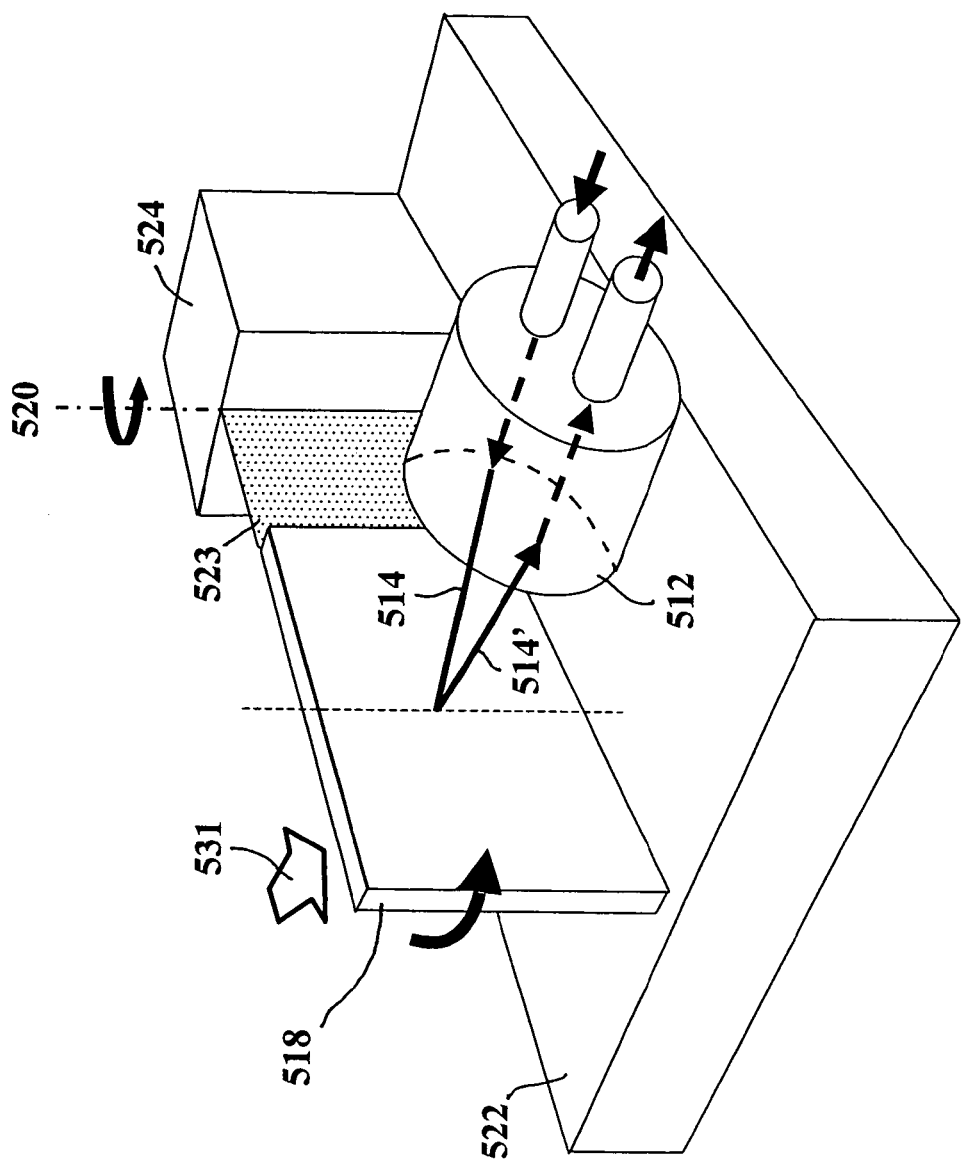
FIG. 5B is a schematic illustration of the present VOA, which comprises an in-plane tilted mirror and a lens connected with input port and output port.

Obviously, it is desired to have a tilted or rotational mirror assembled with input and output optics in a 2D manner, thereby only small actuator displacement and force output is required to generate a relative small quantity of rotation angle, while the tedious 3D alignment and assembly work can be avoided. The possibility of making a tilted or rotational mirror assembled with input and output optics in a 2D manner has been disclosed by J. D. Grade and H. Jerman, "MEMS electrostatic actuators for optical switching applications," in proceedings of OFC 2001, Optical Fiber Communication Conference and Exhibit, 2001, Vol. 3, p. WX2-1–WX2-3, March 2001; U.S. Pat. No. 6,329,737, "Rotary electrostatic microactuator,"; U.S. Pat. No. 6,333,584, "Tiltable electrostatic microactuator and method for using same,", U.S. Pat. No. 6,469,415, "Balanced microdevice and rotary electrostatic microactuator use therewith,"; and J. Andrew Yeh and C.-Y Wu, "Full-range linearization of rotary combdrive-actuated micro-mirrors for optical telecommunication," in proceedings of Optical MEMS 2002, IEEE/LEOS International Conference on Optical MEMS 2002, p. 93–94, Aug. 20–23, 2002. These priors presented the applications of using a pop-up rotational mirror driven by rotary electrostatic actuator for optical switch and tunable laser. But this kind of device arrangement also reveals the possibility of being used as a MEMS VOA device, as shown in FIGS. 4A and 4B. Referring to FIGS. 4A and 4B, a tilted or rotational mirror 18 driven by an actuator 30 to perform in-plane (planar) deflection angle change along with the central axis 20 is assembled with input and output ports, 13 and 13', on top of substrate 22 in a 2D manner. Due to different deflection angles of the tilted or rotational mirror 18, the attenuation value is determined by the coupled reflected light beam 14' into output port 13' regarding to different light paths of the reflected light beam 14'.

The First Embodiment

FIGS. 5A, 5B, 5C and 5D show the MEMS VOA device in accordance with the present invention. The MEMS VOA device 510 is made by using micromachining technology. The MEMS VOA device 510 comprises a tilted mirror 518 which is suspended and supported via flexure spring 523 by a post (or a pivot) 524 onto a substrate 522, and input and output optics and fibers 512, 513, 513' arranged on top of a substrate 522. Once the actuator 530 is under an electrical load, this tilted mirror 518 will have in-plane rotational movement and in-plane displacement with respect to the pivot or upright axis 520, because a driving force 531 is generated by the actuator 530 and applied to the tilted mirror 518 on a contacting point 533 through flexure spring 532. In the other words, the tilted mirror 518 in present invention exhibits movement comprising planar rotational mirror deflection (denoted as ø541 in FIG. 5D) and planar parallel shifted mirror displacement (denoted as t545 in FIG. 5D).

The flexure spring 523 is design to be able to provide the movement of said tilted mirror 518 in which can consist rotational mirror deflection and parallel mirror shifted displacement. Additionally, with proper structure design and materials selections, the flexure spring 523 can also help said VOA device to against the environment temperature shock, and mechanical shock. Thus the materials of flexure spring 523 are designed to be a kind of materials or plural kinds of materials. For example, a meander-shaped high-aspect-ratio single crystal silicon spring can generate appropriate rotational mirror deflection and parallel mirror shifted displacement at the same time, while its anti-mechanical-shock capability with respect to directions other than moving directions can be very strong. The corresponding experimental results exhibit the attenuation value at 20 dB attenuation only change less than +/−0.2 dB for 20g shock from 10 Hz to 2000z dynamic range, such performance is complied with Telecordia testing requirements. On the other hand, the design of spring 532 should be optimized to provide adequate actuation transfer. Because the mirror movement would be delayed regarding to the actuator action and the attenuation speed would become slow, if the spring 532 is made to be too soft. In contrary, if the spring 532 were made to be too rigid or too stiff, then such high rotational stiffness would decrease the mirror rotational deflection, or consequently reduce the light attenuation efficiency, or decrease the effectiveness of changing the reflected light beam path. For example, the spring 532 is designed to include a flexure part in its structure, like a meander-shaped spring, to let the force and displacement generated by actuator can be converted into mirror rotational deflection and parallel mirror shifted displacement efficiently, while this flexure part can lead the spring 532 to be able to absorb the environment shock or vibration without facing any influence on the precise control of attenuation contributed by noise of environment shock or vibration.

FIG. 5C shows the initial state of the invented MEMS VOA device 510, the incident light beam 514 from the A point of the input port of optics and fiber 513 transmits toward the tilted mirror 518 at B point and is reflected toward C point. The reflected light beam 514' is directing to output port of optics and fiber 513', and is fully coupled into output port with minimum insertion loss, therefore it is called as the no attenuation state. The angle between the incident light beam 514 and reflected light beam 514' is defined as 2θ, where θ 540 means the angle between the incident light beam 514 or reflected light beam 514' and in-plane perpendicular direction of tilted mirror 518. When actuator 530 drive the tilted mirror 518 to move to position shown as tilted mirror 518', the incoming light beam 514 incidents on to tilted mirror 518' at B' point and is reflected toward D' point, as shown in FIG. 5D. Only a portion of reflected light beam 514'c is coupled into output port of optics and fibers 513', due to the coupling efficiency is not as optimal as the case of reflected light beam 514'a. Thus the uncoupled light is attenuated. If we adjust the position of tilted mirror 518', then the corresponding coupled light intensity will be different, therefore we can control the attenuation range of MEMS VOA device 510.

Comparing present invention to prior arts of tilted mirror approach, present invented device demonstrates a more efficient and sensitive attenuation mechanism. In the conventional tilted (rotational) mirror case, the reflected light beam 514'b is observed for deflection angle ø541 of tilted mirror 518, when the incident light beam 514 from the A point of input port toward the B point of tilted mirror 518, and is reflected toward the D point. The angle between two states of reflected light beam of 514'a and 514'b is twice of mirror deflection angle ø541 and is defined as 2ø542. The tilted mirror is rotated along with an axis perpendicular toward out-of-plane (upright) direction of substrate via the B point. In the other words, the mirror rotates along with a central axis 20 as shown in FIG. 1 and FIG. 4. In present invention, the tilted mirror 518 in MEMS VOA device 510 does not only provide mirror deflection angle ø541, but also generate mirror parallel shifted displacement t545. The path of reflected light beam 514'a of perfectly coupled case (no attenuation case) is shifted from the path of reflected light beam 514'b of conventional tilted mirror case to the path of reflected light beam 514'c of present inventions. The reflected light beam is from B point to C point for device without attenuation. For device under attenuation, the reflected light beam becomes from B point to D point for the conventional tilted mirror case, and it becomes from B' point to D' point for the present invention case. A parallel shifted displacement (or distance) 545't' is observed between line of BD and line of B'D'. Because the tilted mirror is deflected along with the pivot or upright axis 520 which is located at one side of tilted mirror 518, instead of center of tilted mirror, for example, the central axis 20 as shown in FIG. 1 and FIG. 4. With the contribution of the mirror parallel shifted displacement 545't', the present invention can perform more sensitive and efficient attenuation mechanism than all aforementioned prior arts.

The Second Embodiment

FIGS. 6A and 6B show the device optical light path configuration for said MEMS VOA device 510 under normally close operation, or dark type VOA device configuration. In this case, original mirror position shown as the tilted mirror 618 is away from an optimal position of tilted mirror 618', where device achieve minimum coupling loss at this position, or no attenuation. The reflected light beam 614'a from the b point to the d point is away from the optimal reflected light beam 614'c from the b' point to the c point. The corresponding attenuation value of MEMS VOA device 510 in FIG. 6A is set to be fully attenuation, i.e., no light transmitted. When the actuator 630 drives the tilted mirror 618 with a force 631 to move to an optimal position of tilted mirror 618', the incident light beam 614 transmits toward the tilted mirror 618' at the point b' and is reflected toward the point c, the corresponding reflected light beam path is 614'c which means the best coupling state, i.e., no attenuation state. Again, comparing this state of optical path configuration provided by the MEMS VOA device 510 under normally close operation with the state of optical path formed by using traditional tilted mirror approach, the reflected light beam is shifted from the reflected light beam 614'b of line of bd' in the traditional tilted mirror approach to the reflected light beam 614'c of line of b'c in the present invention approach. The shifted distance between lines of bd' and b'c denoted as t 645 contributes to our invented MEMS VOA device 510 to let said MEMS VOA device 510 become more effective in the attenuation mechanism than all aforementioned prior arts.

The Third Embodiment

In the present invention, the actuator 530 or 630 drives the tilted mirror to move with a force load 531 or 631 at the contacting point 533 or 633 through a spring 532 or 632, as shown in FIGS. 5 and 6. The spring 532 or 632 is designed to be effectively transfer force or displacement generated from actuator 530 or 630 to tilted mirror 518 or 618, and is designed to be a structure including a portion of flexure part that is capable of absorbing the environment mechanical shock or vibration without disturbing the actuation operation along the direction of force 531 or 631 when said MEMS VOA device 510 under operation. For example, the flexure part of said spring 532 or 632 could be a meander-shaped high-aspect-ratio single crystal silicon spring which is able to properly make mirror movement comprising the parallel mirror shifted displacement and rotational mirror deflection, and can reduce the influence of mechanical shock or vibration with respect to directions other than moving directions.

The Fourth Embodiment

In the present invention, the tilted mirror 518 or 618 is a free-standing movable mirror and is supported by the flexure spring 523 or 623, where the flexure spring 523 or 623 is anchored onto the substrate via a post (or a pivot) 524, as shown in FIGS. 5 and 6. This flexure spring 523 or 623 is capable of enabling mirror deflection angle and mirror parallel shifted displacement when actuator 530 or 630 apply a force 531 or 631 onto tilted mirror 518 or 618, as shown in FIGS. 5 and 6, respectively. The structure of the flexure spring 523 or 623 is designed to be strong enough to be able to against the environment shock and vibration, and is made to be soft enough to be bent to provide rotational mirror deflection and parallel shifted displacement of mirror. The materials of the flexure spring 523 or 623 can be rigid materials, like silicon or ceramics, etc., or deformable materials, like metals, etc., or elastic materials, like polymers, polyimides, PDMS, etc. The materials of the flexure spring 523 or 623 is adopted to be able to help said MEMS VOA device 510 to be stable and reliable against the environment temperature shock, and environment mechanical shock and vibration.

The Fifth Embodiment

Figure 7:
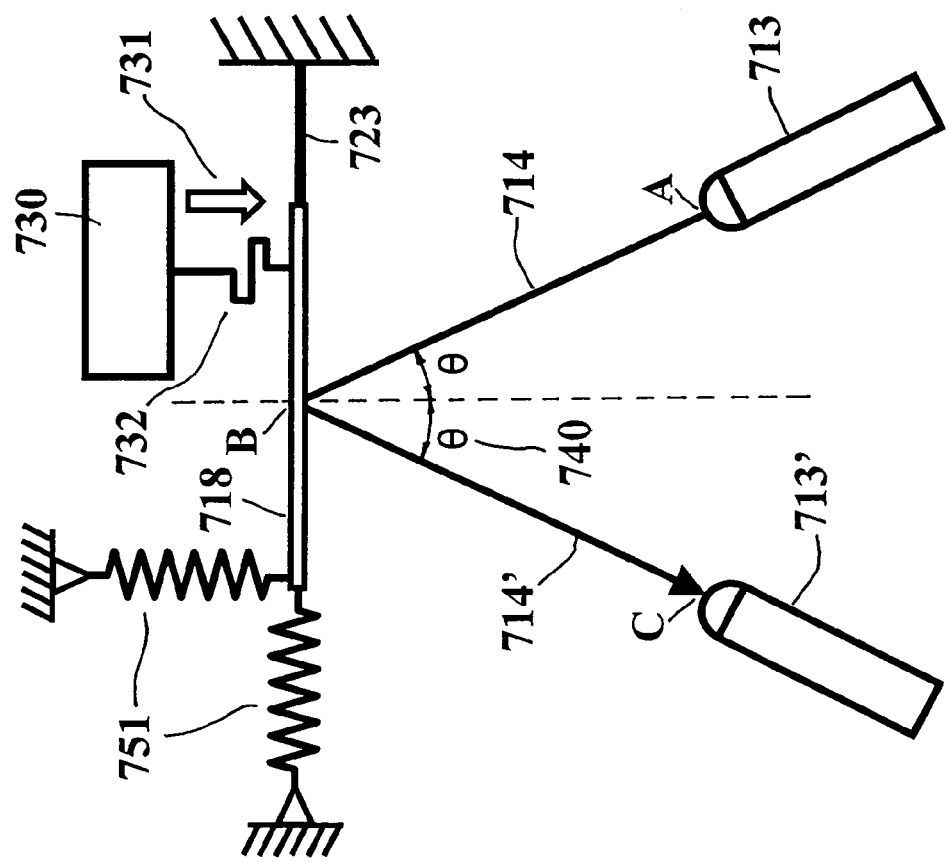
FIG. 7 demonstrates an embodiment of invented VOA device with enhanced anti-mechanical-shock capability via further connected with the supporting springs.

In the present invention, as shown in FIG. 7, the tilted mirror 718 is supported by and connected with springs 723 and 732 to let the structure of MEMS VOA device 510 to show better anti-mechanical-shock capability. Further improvement of anti-mechanical-shock capability can be made by integrating and connecting plural supporting springs 751 with the tilted mirror 718. Again these plural supporting springs 751 are designed to be flexure enough to let the tilted mirror 718 to be moved under force load 731, and to be rigid enough to help the MEMS VOA device 510 to avoid the un-wanted environment mechanical shock and vibration.

The Sixth Embodiment

Figure 8B:
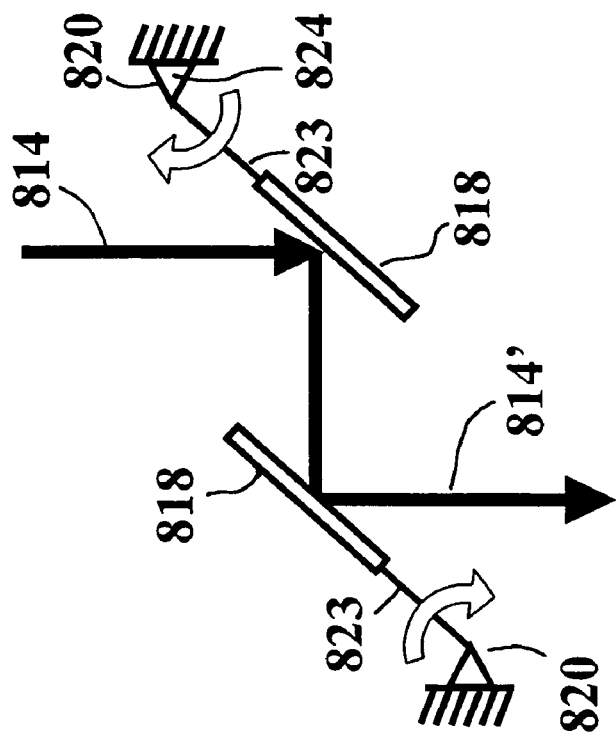
FIGS. 8A and 8B illustrates two embodiments of invented VOA devices comprised of plural tilted mirrors to form a multiple-reflection light path in a two-dimensional light path configuration.
Figure 8A:
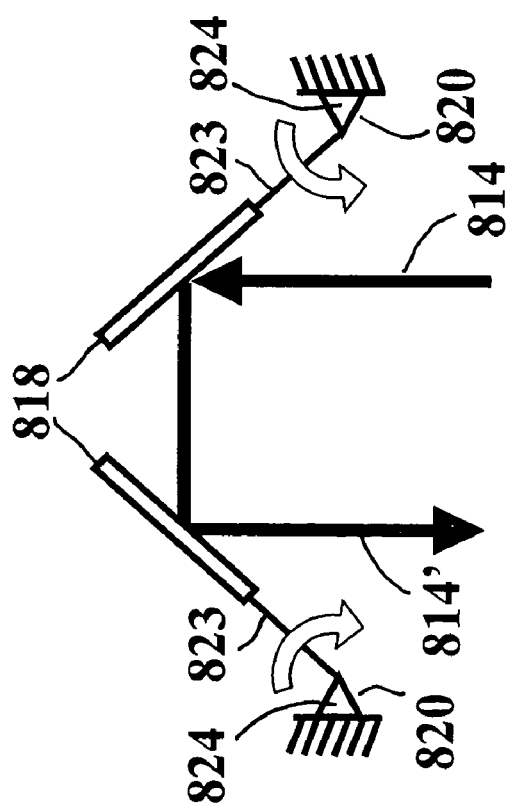

In the present invention, as shown in FIG. 8, the plural tilted mirrors 818 are held individually by plural flexure springs 823, and each of these flexure springs 823 is connected with a post (or a pivot) 824 anchored onto a substrate. Each of said tilted mirrors 818 generates mirror movement comprising rotational mirror deflection and parallel shifted mirror displacement with respect to the upright axis 820 when said tilted mirrors 818 are actuated in an individually control manner. Optics and fibers of input and output ports are arranged, aligned, and assembled with said plural tilted mirrors 818 to form kinds of multiple-reflection light path, as shown in FIGS. 8A and 8B. The actuators drive said plural tilted mirrors to relative actuated-positions away from the initial rest positions in an individually control manner, thus the overall coupling loss after multiple-reflection process is defined as the attenuation value of said MEMS VOA device 510. In the other words, said MEMS VOA device 510 is a bright type VOA, i.e., under normally open operation, when the initial insertion loss regarding to overall light coupling is adjusted to be a minimum value, while said MEMS VOA device 510 is a dark type VOA, i.e., under normally close operation, when the initial insertion loss regarding to overall light coupling is adjusted to be a maximum value. Then the corresponding position for each tilted mirror of plural tilted mirrors 818 is individually and simultaneously controlled so as to the attenuation value of MEMS VOA device 510 is controlled and made to be a pre-determined value from 0% to 100% attenuation.

The present invention has been described in conjunction with the preferred embodiments. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense. As noted above, the present invention is applicable to the use, operation, structure and fabrication of a number of different variable optical attenuator assemblies. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications, devices and methods.

What is claimed is:

1. A variable optical attenuator comprising:
   a reflective tilted mirror connected with a flexure spring which is support by a post anchored onto a substrate;
   an actuator for driving said tilted mirror to an actuated position away from the initial rest position, wherein this mirror movement including rotational mirror deflection and parallel mirror shifted displacement;
   a flexure spring for holding said tilted mirror at one side and can be deformed to let said tilted mirror to exhibit movement including rotational mirror deflection and parallel mirror shifted displacement;
   optics and fibers of input and output ports to be aligned, arranged, and assembled with said tilted mirror onto said substrate in a two dimensional optical light path arrangement;
   wherein said tilted mirror is driven by said actuator to reflect incident light beam toward a direction corresponding to particular actuated mirror position;
   and the uncoupled reflected light beam to output port is the attenuated light, while the value of attenuation is contributed by the coupling loss, and is determined by said particular actuated mirror position.

2. The variable optical attenuator as claimed in claim 1, wherein the initial state of said variable optical attenuator shows an optical light path arrangement to let said reflected light beam fully coupled into output port, when said actuator is maintained at its initial state; and, a portion of reflected light is attenuated from output port when said tilted mirror moves away from original position regarding to an applied force generated from said actuator under actuation.

3. The variable optical attenuator as claimed in claim 1, wherein the initial state of said variable optical attenuator shows an optical light path arrangement to let said reflected light beam fully attenuated from output port, when said actuator is maintained at its initial state; and, a portion of reflected light is started to be coupled into output port when said tilted mirror moves away from original position regarding to an applied force generated from said actuator under actuation.

4. The variable optical attenuator as claimed in claim 1, wherein said actuator drives said tilted mirror with a force to be transferred via a spring connected with said actuator.

5. A variable optical attenuator comprising:
   a reflective tilted mirror connected with a flexure spring which is support by a post anchored onto a substrate;
   an actuator for driving said tilted mirror with a force transferred via a spring connected with said actuator to an actuated position away from the initial rest position, and this mirror movement including rotational mirror deflection and parallel mirror shifted displacement;
   a flexure spring for holding said tilted mirror at one side and can be deformed to let said tilted mirror to exhibit movement including rotational mirror deflection and parallel mirror shifted displacement;
   optics and fibers of input and output ports which are aligned, arranged, and assembled with said tilted mirror onto said substrate in a two dimensional optical light path arrangement;
   wherein said tilted mirror is driven by said actuator to reflect incident light beam toward a direction corresponding to particular actuated mirror position;
   and the uncoupled reflected light beam to output port is the attenuated light, while the value of attenuation is contributed by the coupling loss, and is determined by said particular actuated mirror position.

6. The variable optical attenuator as claimed in claim 5, wherein said spring between said tilted mirror and said actuator is designed to have enough stiffness to be able to transfer force or displacement generated from said actuator to said tilted mirror in an efficient way, and said spring includes a portion of flexure part that is capable of absorbing the environment shock or vibration without disturbing the transfer of actuation.

7. The variable optical attenuator as claimed in claim 5, wherein said flexure spring for holding said tilted mirror at one side comprises one of the following materials: silicon, ceramics, glass, metals, polymers, and other elastic materials.

8. The variable optical attenuator as claimed in claim 5, wherein said flexure spring for holding said tilted mirror at one side comprises a plurality of the following materials: silicon, ceramics, glass, metals, polymers, and other elastic materials.

9. The variable optical attenuator as claimed in claim 5, wherein the materials and structure of said flexure spring for holding said tilted mirror at one side is stable and reliable to against the environment temperature shock, and environment mechanical shock.

10. The variable optical attenuator as claimed in claim 5, wherein said spring between said tilted mirror and said actuator comprises one of the following materials: silicon, ceramics, glass, metals, polymers, and other elastic materials.

11. The variable optical attenuator as claimed in claim 5, wherein said spring between said tilted mirror and said actuator comprises a plurality of the following materials: silicon, ceramics, glass, metals, polymers, and other elastic materials.

12. The variable optical attenuator as claimed in claim 5, wherein said spring between said tilted mirror and said actuator is mechanically contacted and connected with said tilted mirror in order to improve the anti-mechanical-shock capability of said variable optical attenuator device.

13. The variable optical attenuator as claimed in claim 5, wherein in addition to said spring between said tilted mirror and said actuator, there is a spring mechanically contacted and connected with said tilted mirror in order to improve the anti-mechanical-shock capability of said variable optical attenuator device.

14. The variable optical attenuator as claimed in claim 5, wherein in addition to said spring between said tilted mirror and said actuator, there are more than one springs mechanically contacted and connected with said tilted mirror in order to improve the anti-mechanical-shock capability of said variable optical attenuator device.

15. A variable optical attenuator comprising:
reflective tilted mirrors connected with flexure springs and arranged with optics and fibers of input and output ports to form a multiple-reflection light path configuration, wherein the light attenuation is conducted by changing the reflected light beam path away from the optimal light beam path, thus the optimized state of that the reflected light beam reflected from a tilted mirror toward the output port which is fully coupled into output port with minimum insertion loss is changed so as to achieve the light attenuation;
a plurality of flexure springs, each of the flexure springs is supported by a post anchored onto a substrate and connected with each of titled mirrors;
actuators for driving said tilted mirrors to relative actuated-positions away from the initial rest positions in an individually control manner, and this mirror movement including rotational mirror deflection and parallel mirror shifted displacement;
a flexure spring for holding one of said tilted mirrors at one side and can be deformed to let said tilted mirrors to exhibit movement including rotational mirror deflection and parallel mirror shifted displacement;
optics and fibers of input and output ports to be aligned, arranged, and assembled with said tilted mirrors onto said substrate in a two dimensional optical light path arrangement;
wherein said tilted mirrors driven by said actuators to conduct multiple-reflection of incident light beam toward a direction corresponding to particular actuated positions of relative tilted mirrors; and the uncoupled reflected light beam to output port during multiple-reflection process is the attenuated light, while the value of attenuation is contributed by the overall coupling loss during multiple-reflection process and is determined by said particular actuated positions of relative tilted mirrors.

16. A variable optical attenuator comprising:
reflective tilted mirrors connected with flexure springs and arranged with optics and fibers of input and output ports to form a multiple-reflection light path configuration, wherein the initial light attenuation is designed to be its maximum attenuation value, and the light attenuation value is decreased by changing the reflected light beam path away from the original light beam path, and the reflected light beam reflected from a tilted mirror toward output port is started to be coupled into output port, thus a portion of reflected light beam transmitted into the output port; and, upon an optimized state of that multiple tilted mirrors are individually controlled to enable said variable optical attenuator under an operation situation that the reflected light beam reflected from a tilted mirror toward the output port after multiple-reflection process is fully coupled into output port with minimum insertion loss;
a plurality of flexure springs, each of the flexure springs is supported by a post anchored onto a substrate and connected with each of titled mirrors;
actuators for driving said tilted mirrors to relative actuated-positions away from the initial rest positions in an individually control manner, and this mirror movement including rotational mirror deflection and parallel mirror shifted displacement;
a flexure spring for holding one of said tilted mirrors at one side and can be deformed to let said tilted mirrors to exhibit movement including rotational mirror deflection and parallel mirror shifted displacement;
optics and fibers of input and output ports to be aligned, arranged, and assembled with said tilted mirrors onto said substrate in a two dimensional optical light path arrangement;
wherein said tilted mirrors driven by said actuators to conduct multiple-reflection of incident light beam toward a direction corresponding to particular actuated positions of relative tilted mirrors; and the uncoupled reflected light beam to output port during multiple-reflection process is the attenuated light, while the value of attenuation is contributed by the overall coupling loss during multiple-reflection process and is determined by said particular actuated positions of relative tilted mirrors.

* * * * *